(No Model.)

E. T. BLUNT.
APPARATUS FOR COMPRESSING ENSILAGE.

No. 309,685. Patented Dec. 23, 1884.

Witnesses:
W. E. Poulter
Paul N. Knobloch

Inventor:
Edward T. Blunt
or Henry Orth
his att.

UNITED STATES PATENT OFFICE.

EDWARD THORNTON BLUNT, OF BLABY HILL, ENGLAND.

APPARATUS FOR COMPRESSING ENSILAGE.

SPECIFICATION forming part of Letters Patent No. 309,685, dated December 23, 1884.

Application filed October 10, 1884. (No model.)

*To all whom it may concern:*

Be it known that I, EDWARD THORNTON BLUNT, a subject of the Queen of England, residing at Blaby Hill, England, have invented a new and useful Apparatus for Compressing Ensilage, of which the following is a specification.

The object of this invention is to provide a pressure upon the grass which shall follow it as it is gradually compressed and maintain approximately the same pressure all through. I secure in the bottom of the silo or cavity in which the grass is to be placed one or more rods or equivalent, screwed at the upper end, jointed or not below. This rod I keep as near the center of the silo as practicable or desirable. The "lid" of the silo is provided with ribs or equivalent, which may join in the center or to a central post in such manner as to distribute the pressure as equally as possible all over the lid. The screwed rod passes through the lid, and a suitable lever, preferably forked or divided so as to fit over the central post of the lid, bears with one end under a nut upon the screwed rod and upon the central stem of the lid near this end, and carries a suitable weight at or near its other end; or the weight may be removable along the lever.

In use the grass or other green crop is placed in the "silo" and the lid put on and the lever and weight adjusted, the screw-nut upon the rod being put at the right height to suit the lever. Now, when the grass is reduced in bulk, the long arm of the lever falls as the lid goes down, and this is raised again by screwing down the nut and forcing down the short arm of the lever, and so raising the long arm, and also or otherwise by placing the pin I upon which the lever bears through another and higher hole in the central post, E. The lever is adjustably fulcrumed upon the post or lid in any convenient manner, and it is evident that by this means a constant and approximately even pressure can be maintained, notwithstanding the compression of the grass, the pressure weight required, &c., being arranged according to the length of lever and the distance between its shorter end and its fulcrum.

The details may be varied of course. For instance, two rods and two nuts, instead of the single ones, may be used; or the whole apparatus may be duplicated, quadrupled, &c.; or instead of the rod, as described, beams could be secured across the top of the silo and fitted with screws; but I have above described the simple apparatus and method of its working, the precise details of its construction being immaterial.

Figure 1:
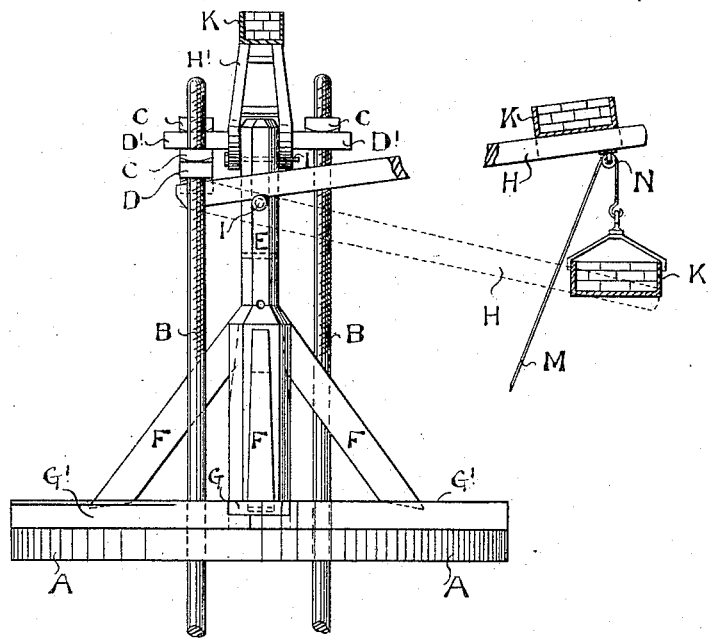
Figure 2:
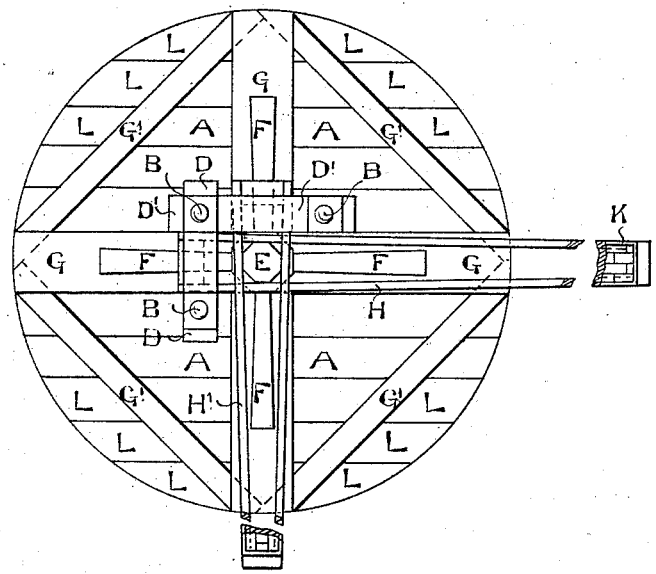

In the accompanying drawings, Figure 1 is an elevation, and Fig. 2 a plan, of the apparatus.

Like letters of reference represent like parts in both views.

A is the lid of the silo or recess, and B the rods, of which three are shown, secured in any convenient manner at the bottom, and screwed at their upper ends, where they are fitted with nuts C. Cross-bars D D' are by preference used, as shown, as they help to support the rods B and keep them at the proper distance apart.

E is the central post, supported by and bearing upon the struts F, which also serve to distribute the pressure over the lid; and G G' are various cross pieces or beams to strengthen the lid and distribute the pressure, upon some or all of which the struts F rest and press.

H H' are the levers, and I are pins passing through the post E and supporting the levers H H'. The weight-boxes K may be filled with bricks or stones, and are adjustable upon or fastened to the levers, so that the requisite weight may be readily obtained.

For convenience a loose weight-box may be used and weighted upon the ground. A rope, M, is fastened to it, and passes over a pulley, N, upon the lever, its other end being secured in any convenient manner when the weight has been run up. This arrangement also is shown in Fig. 1.

The operation is as follows: The silo having been filled, the lid A is put on and the various parts put in position somewhat as shown in Fig. 1. The lever H, having its short end resting under the cross-bar D, rests its whole weight upon the pin I, which passing through the post E, the weight is transferred to the post, and so to the whole lid. As the grass is compressed under the effect of the weight, the lid sinks, and with it the post E and long arm of the lever, till it slants down, as shown in dotted lines. To return it to its original position the nuts C are then screwed down, pushing the cross-bar D before them. This carries down the short end of the lever H and raises the long end till it assumes its original position, and also or otherwise the pin I, upon which the lever bears, is passed to a higher hole in the central post. By the former means it will be noticed that the weight continuously presses upon the grass within the silo even while the lever is being adjusted.

The operation of the lever H' is precisely the same as that of lever H; but by dividing the weight the levers can be made lighter, and it is found more convenient to have two levers than one.

The lid is constructed as follows: A number of pieces of wood, L, are laid side by side upon the green crop in the silo and the frame placed upon it. This frame consists of the cross G, extending across the whole lid, as shown in Fig. 2, and generally distributing the weight, cross-beams G', placed across the lid, connecting the ends of the cross G, as shown. The object of these pieces is to cover that portion of the lid not otherwise protected, so that the ends of the planks L not covered by the cross G are kept under pressure by the cross-beams G', which thus prevent them from bending up the struts F, which convey the pressure from the pillar E to the outer portion of the cross G and the pillar E.

I claim—

1. In an apparatus for compressing ensilage, the combination, with the pillar E, of the lever H, fulcrumed upon said pillar, and having its short arm controlled by an adjustable bearing, D, substantially in the manner and for the purpose specified.

2. In an apparatus for compressing ensilage, the combination, with lever H, of screw-rods B, which afford an adjustable bearing to the short arm of said lever, for the purpose specified.

3. The combination, with screw-rods B, of cross-bars D D', which serve as a bearing for the ends of levers H H' and keep said rods B at proper distances, substantially as set forth.

4. In an apparatus for compressing ensilage, the combination, with the movable lid A, of screwed rods B, secured to the bottom of the silo, and passing through said lid, for the purpose specified.

5. The combination, with the lid A of a silo, composed of loose pieces L, laid side by side, of a detachable frame-work, E F G G', for the purpose specified.

6. In a frame-work for the silo-lid A, the combination of the pillar E, struts F, cross G, and cross-beams G', substantially in the manner and for the purpose specified.

7. The combination, with the lever H, of the separate weight-box K, arranged to be loaded on the ground and run up to its place by a rope and pulley, substantially as set forth.

In testimony whereof I have hereunto set my hand in the presence of two subscribing witnesses.

EDWARD THORNTON BLUNT.

Witnesses:
  GEO. H. BLUNT,
    *Solicitor, Leicester.*
  CHARLES H. PAGE.
    *His Clerk.*